United States Patent
Rabiah et al.

(10) Patent No.: US 12,549,559 B2
(45) Date of Patent: Feb. 10, 2026

(54) LIGHTWEIGHT NETWORK AUTHENTICATION FOR RESOURCE CONSTRAINED DEVICES VIA MERGEABLE STATEFUL SIGNATURES

(71) Applicant: The Regents of the University of California, Oakland, CA (US)

(72) Inventors: Abdulrahman Bin Rabiah, Irvine, CA (US); Yugarshi Shashwat, Riverside, CA (US); Silas Richelson, Riverside, CA (US); Nael Abu-Ghazaleh, Riverside, CA (US)

(73) Assignee: The Regents of University of California, Oakland, CA (US)

( * ) Notice: Subject to any disclaimer, the term of this patent is extended or adjusted under 35 U.S.C. 154(b) by 258 days.

(21) Appl. No.: 17/856,849

(22) Filed: Jul. 1, 2022

(65) Prior Publication Data
US 2023/0034512 A1  Feb. 2, 2023

Related U.S. Application Data

(60) Provisional application No. 63/218,807, filed on Jul. 6, 2021.

(51) Int. Cl.
*H04L 9/40* (2022.01)
*H04L 9/08* (2006.01)
*H04L 9/32* (2006.01)

(52) U.S. Cl.
CPC .......... *H04L 63/105* (2013.01); *H04L 9/0863* (2013.01); *H04L 9/3247* (2013.01)

(58) Field of Classification Search
CPC .... H04L 63/105; H04L 9/0863; H04L 9/3247
See application file for complete search history.

(56) References Cited

U.S. PATENT DOCUMENTS 9,294,476 B1 * 3/2016 Lurey ................ H04L 63/0838
9,589,397 B1 * 3/2017 Christopher .......... H04W 12/06
(Continued)

OTHER PUBLICATIONS

Mughal MA, Luo X, Ullah A, Ullah S, Mahmood Z. A lightweight digital signature based security scheme for human-centered Internet of Things. IEEE access. Jun. 6, 2018;6:31630-43. (Year: 2018).*
(Continued)

*Primary Examiner* — James R Turchen
(74) *Attorney, Agent, or Firm* — Ivan Miles Posey

(57) ABSTRACT

Signature-based authentication is a core cryptographic primitive essential for most secure networking protocols. A new signature scheme, MSS, allows a client to efficiently authenticate herself to a server. The new scheme is modeled in an offline/online model where client online time is premium. The offline component derives basis signatures that are then composed based on the data being signed to provide signatures efficiently and securely during run-time. MSS requires the server to maintain state and is suitable for applications where a device has long-term associations with the server. MSS allows direct comparison to hash chains-based authentication schemes used in similar settings, and is relevant to resource-constrained devices, e.g., IoT. MSS instantiations are derived for two cryptographic families, assuming the hardness of RSA and decisional Diffie-Hellman (DDH) respectively. Then used is the new scheme to design an efficient time-based one-time password (TOTP) protocol.

18 Claims, 5 Drawing Sheets

(56) References Cited

U.S. PATENT DOCUMENTS

| | | | | |
|---|---|---|---|---|
| 9,596,223 | B1* | 3/2017 | Mezei | H04L 63/0838 |
| 11,635,952 | B2* | 4/2023 | Katsumata | G06F 8/65 713/150 |
| 2017/0357799 | A1* | 12/2017 | Fehér | H04L 63/0846 |
| 2018/0234251 | A1* | 8/2018 | Oberheide | G06F 21/40 |
| 2019/0013945 | A1* | 1/2019 | Hamlin | G06F 11/0709 |
| 2022/0124080 | A1* | 4/2022 | Howard | H04L 63/08 |

OTHER PUBLICATIONS

Yu p. Tate SR. An online/offline signature scheme based on the strong rsa assumption. In21st International Conference on Advanced Information Networking and Applications Workshops (AINAW'07) May 21, 2007 (vol. 1, pp. 601-606). IEEE. (Year: 2007).*
Hammi B, Fayad A, Khatoun R, Zeadally S, Begriche Y. A lightweight ECC-based authentication scheme for Internet of Things (IoT) . IEEE Systems Journal. Feb. 17, 2020;14(3):3440-50. (Year: 2020).*
Even S, Goldreich O, Micali S. On-line/off-line digital signatures. Journal of Cryptology. Mar. 1996;9:35-67. (Year: 1996).*
Using TOTP instead of passwords for IoT device authentication; May 5, 2016; retrieved from https://security.stackexchange.com/questions/122406/using-totp-instead-of-passwords-for-iot-device-authentication/122411#122411 (Year: 2016).*
D. Airehrour et al. "Secure routing for internet of things: A survey". In: Journal of Network and Computer Applications. Elsevier, 2016.
L. Dignan. "Dyn confirms Mirai botnet involved in distributed denial of service attack". In: ZDNet (Oct. 26, 2016).
S. Singh et al. "Advanced lightweight encryption algorithms for IoT devices: survey, challenges and solutions". In: JAIHC. Springer, 2017.
S. Even, O. Goldreich, and S. Micali. "On-line/off-line digital signatures". In: Journal of Cryptology (1996).
D. Kogan, N. Manohar, and D. Boneh. "T/Key: Second-Factor Authentication From Secure Hash Chains". In: CCS. ACM, 2017.
S. Goldwasser, S. Micali, and R. Rivest. "A Digital Signature Scheme Secure Against Adaptive Chosen-Message Attacks". In: Siam J. Comput. (1988).
M. Arslan et al. "Computing while charging: Building a distributed computing infrastructure using smartphones". In: CoNEXT. ACM, 2012.
D. Boneh, B. Lynn, and H. Shacham. "Short Signatures from the Weil Pairing". In: J. Cryptology (2004).
D. M'Raihi et al. Hotp: An hmac-based one-time password algorithm. Tech. rep. 2005.
M. Abdalla et al. DHAES: An Encryption Scheme Based on the Diffie-Hellman Problem. Cryptology ePrint Archive, Report 1999/007. 1999.
Jurjen N. Bos and David Chaum. "Prvably Unforgeable Signatures". In: CRYPTO. Springer, 1992.
D. Boneh. "Twenty years of attacks on the RSA cryptosystem". In: Notices of the AMS (1999).
T. ElGamal. "A public key cryptosystem and a signature scheme based on discrete logarithms". In: TIT. IEEE, 1985.
E. B Barker et al. "Sp 800-57. recommendation for key management, part 1: General (revision 4)". In: Tech. Rep. (2016).
Q.S. Nguyen. "Multi-dimensional hash chains and application to micropayment schemes". In: WCC. Springer, 2005.
A. Wang, A. Mohaisen, and S. Chen. "XLF: A cross-layer framework to secure the internet of things (iot)". In: ICDCS. IEEE, 2019.
S. Goldwasser and S. Micali. "Probabilistic Encryption and How to Play Mental Poker Keeping Secret All Partial Information". In: STOC. ACM, 1982.
R. Rivest, A. Shamir, and L. Adleman. "A method for obtaining digital signatures and public-key cryptosystems". In: Communications of the ACM (1978).
G. Sharma, S. Bala, and A.K. Verma. "PF-IBS: Pairing-Free Identity Based Digital Signature Algorithm for Wireless Sensor Networks". In: Wireless Personal Communications. Springer, 2017.
M. Joye. "An efficient on-line/off-line signature scheme without random oracles". In: Conference on Cryptology And Network Security. Springer, 2008.
P. Yu and S. R. Tate. "An Online/Offline Signature Scheme Based on the Strong RSA Assumption". In: Conference on Advanced Information Networking and Applications Workshops. IEEE, 2007.
M. Girault, G. Poupard, and J. Stern. "On the fly authentication and signature schemes based on groups of unknown order". In: Journal of Cryptology. Springer, 2006.
S. Xu et al. "Online/Offline Signatures and Multisignatures for AODV and DSR Routing Security". In: ACISP. Springer, 2006.
K. Kurosawa and K. Schmidt-Samoa. "New online/offline signature schemes without random oracles". In: PKC. Springer, 2006.
C.P. Schnorr. "Efficient Identification and Signatures for Smart Cards". In: CRYPTO. Springer, 1989.
A. Shamir and Y. Tauman. "Improved online/offline signature schemes". In: CRYPTO. Springer, 2001.
Z. Xu, G. Dai, and D. Yang. "An efficient online/offline signcryption scheme for MANET". In: Conference on Advanced Information Networking and Applications Workshops. IEEE, 2007.
Y. Gao et al. "An Improved Online/Offline Identity-Based Signature Scheme for WSNs." In: IJ Network Security. Springer, 2016.
J. Lai et al. "Efficient identity-based online/offline encryption and signcryption with short ciphertext". In: IJ Inf. Secur. Springer, 2017.
L. Lamport. "Password authentication with insecure communication". In: Communications of the ACM (1981).
N. Haller. The S/KEY One-Time Password System. RFC 1760. RFC Editor, 1995.
R. Rivest and A. Shamir. "PayWord and MicroMint: Two simple micropayment schemes". In: International workshop on security protocols. Springer, 1996.
B. Cox, J.D. Tygar, and M. Sirbu. "NetBill Security and Transaction Protocol." In: WOEC. USENIX, 1995.
S. Micali and R. Rivest. "Micropayments revisited". In: Cryptographers' Track at the RSA Conference. Springer, 2002.
B. Bezawada et al. "A template approach to group key establishment in dynamic ad-hoc groups". In: ICNP. IEEE, 2016.
J. Buchmann et al. "On the security of the Winternitz one-time signature scheme". In: AFRICACRYPT. Springer, 2011.
A. Alabrah and M. Bassiouni. "Efficient user and broadcast authentication scheme for WSNs". In: WCNC. IEEE, 2014.
A. Perrig et al. "The TESLA broadcast authentication protocol". In: Rsa Cryptobytes. Citeseer, 2002.
R. Merkle. "Secrecy, authentication, and public key systems". In: Ph.D. Thesis, Stanford University (1979).
M. Shirvanian et al. "Two-Factor Authentication Resilient to Server Compromise Using Mix-Bandwidth Devices." In: NDSS. 2014.
Google. Titan Security Key. https://bit.ly/2EdSsaw. (This is a product—a google titan security key. The documentation for this product is at https://cloud.google.com/security/products/titan-security-key).
A. Czeskis et al. "Strengthening user authentication through opportunistic cryptographic identity assertions". In: CCS. ACM, 2012.
S. Garriss et al. "Trustworthy and personalized computing on public kiosks". In: MobiSys. ACM, 2008.
M. Mannan and P. Van Oorschot. "Using a personal device to strengthen password authentication from an untrusted computer". In: FC. Springer, 2007.
S. Srinivas et al. "Universal 2nd factor (U2F) overview". In: FIDO Alliance Proposed Standard (2015), pp. 1-5.
E. Dauterman et al. "True2F: Backdoor-Resistant Authentication Tokens". In: S&P. IEEE, 2019.
D. M'Raihi et al. Totp: Time-based one-time password algorithm. Tech. rep. 2011.
K. Zetter. "Hacker spies hit security firm RSA". In: Wired (Mar. 17, 2011).
J. Xu, J. Qi, and X. Ye. "OTP bidirectional authentication scheme based on MAC address". In: ICCC. IEEE, 2016.

(56) References Cited

OTHER PUBLICATIONS

E. B Barker et al. "Sp 800-57. recommendation for key management, part 1: General (revision 4)". In: Tech. Rep. (Updated Version from #14 from this list. Date: May 2020).

* cited by examiner

Setup (one time)

Offline signing (as needed)

Online signing (per message)

LIGHTWEIGHT NETWORK AUTHENTICATION FOR RESOURCE CONSTRAINED DEVICES VIA MERGEABLE STATEFUL SIGNATURES

CROSS-REFERENCE TO RELATED APPLICATIONS

This disclosure claims the benefit of the filing dates of U.S. Provisional Patent Application No. 63/218,807, filed Jul. 6, 2021, the entire contents of all of which are hereby expressly incorporated by reference.

TECHNICAL FIELD

Various embodiments described herein generally relate to network security and cryptography, and in particular, an improved architecture or computational platform configured to implement a digital signature scheme, called Mergeable Stateful Signatures (MSS), that allows resource-constrained devices (e.g., Internet of Things, IoT) to efficiently produce and communicate authenticated messages.

BACKGROUND

With the increasing deployment of resource-limited devices (e.g., sensors and Internet of Things devices (IoTs)), designing secure systems with low computational overhead has become a critical issue. When devices have limited computational power, memory and/or energy reserves, security is often sublimated as a priority in relation to requirements associated with reducing protocol latency, reducing CPU and memory footprint, and lowering energy consumption. Several high profile attacks in recent years (e.g., Mirai botnet) highlight the need for better security for these devices.

Authentication is a central challenge in secure protocol design for edge devices, where digital signatures are the traditional solution from cryptography are too costly. Unlike other settings, the IoT environment often has a special system model in which IoT devices frequently communicate a small amount of authenticated data to a single server (e.g., a gateway/sink). For instance, the Message Queue Telemetry Transport (MQTT), a popular IoT networking protocol, uses a publish/subscribe paradigm where IoT devices periodically publish authenticated data to the same MQTT broker. Quick authentication of such data can be critical to saving lives and businesses; consider a patient with irregular heart beats or blood pressure, and thus her doctor must instantly be warned for quick response in case of emergency. Moreover, IoT devices are often powered by limited rechargeable batteries, so the authentication solution must not consume high or relatively excessive amounts energy. Traditional public-key cryptography (PKC) authentication is a computational bottleneck in IoT applications due to the performance constraints of the IoT device; Table I (see below) shows the high computational latency of two digital signature standards on an IoT board along with the high percentage of typical IoT device battery that PKC uses. Often symmetric key cryptography (SKC) is used instead, which imposes key-management issues and introduces new security vulnerabilities; for instance, SKC requires the server to store IoT authentication keys, which makes the IoT devices subject to impersonation attacks if the server is compromised and the keys are stolen. Authentication based on hash chains overcomes traditional SKC shortcomings, but it has a lifespan and requires expensive computation (see also Section V below). Therefore, new public-key authentication solutions that are efficient in computation and energy usage are needed for IoT.

TABLE I

Profile of typical IoT energy consumption and PKC computational latency on Arduino Uno running at 16 MHz.

| | Energy | | Latency (seconds) | |
|---|---|---|---|---|
| Operation | Consumption | Operation | RSA | EdDSA |
| PKC | 51.81% | Sign/Decrypt | 731.52 | 6.11 |
| Sensing | 48.15% | Verify/Encrypt | 8.26 | 9.72 |
| Communication | 0.03% | — | — | — |

Known authentication schemes utilizing a Lamport-like one-time signature scheme for efficient online message signing and a traditional signature scheme for offline signing (see S. Even, O. Goldreich, and S. Micali. "On-line/off-line digital signatures". In: *Journal of Cryptology* (1996), which is hereby incorporated by reference) impose long signatures which are expensive in resource-constrained environments. Other schemes improve the signature phase at the expense of imposing extra overhead on the signature verification phase, which is infeasible if the signature verifier is constrained (e.g., a smart lock) and/or incur additional expensive computations during offline signing in order to make online signing more efficient.

T/Key is a recent hash chain-based time-based one-time password (TOTP) system that restricts each password to a small authentication window to restrict phishing. However, infrequent authentications make its verification expensive.

Online second-factor authentication relies on challenge-response protocols between the second-factor device and server, requiring bidirectional communication. Some such schemes utilize one-time-password (OTP) systems when the second-factor device is offline.

It would be helpful to be able to provide a digital signature scheme that allows IoT devices (e.g., smart watch) to produce and communicate authenticated messages in a faster and energy-saving manner.

It would be helpful to be able to provide a useful and efficient (in terms of latency and energy consumption) replacement for digital signature schemes that are currently being used in IoT communication protocols such as Hypertext Transfer Protocol (HTTP) and Message Queuing Telemetry Transport (MQTT) over Transport Layer Security (TLS).

It would be helpful to be able to provide a digital signature authentication scheme/system that achieves efficient online signing without incurring extra overhead at offline signing, or imposing long signatures or extra overhead on the signature verification phase.

It would be helpful to be able to provide a hash chain-based time-based one-time password (TOTP) protocol/authentication system that overcomes the issue of infrequent authentications (associated with prior systems utilizing a small authentication window to restrict phishing) which makes its verification expensive.

It would be helpful to be able to provide a TOTP authentication system which includes/incorporates offline second factor authentication and that provides improved efficiency.

It would be helpful to be able to provide a TOTP system that takes into consideration the limited computational power and energy of IoT devices (e.g., smart watch, temperature sensor, etc.) and provide it (the system) with the ability to perform two factor authentication.

It would be helpful to be able to reduce authentication latency and energy consumption in a TOTP authentication scheme/system.

It would be helpful to be able to provide enhanced security for systems (e.g., two-factor authentication systems) of cloud providers for IoT devices.

It would be helpful to be able to provide enhanced security for security and authenticator apps at low computational costs.

SUMMARY OF THE INVENTION

Herein is described a novel signature scheme which yields an authentication protocol with low overhead. The system, which the applicants call Mergeable Stateful Signatures (MSS), operates in a model where the verifier is assumed to always be the same party (e.g., an MQTT broker). This stateful property allows state to be maintained across multiple signatures, which in turn allows for efficiency improvements over standard signatures. The MSS scheme involves utilization of a special malleability property of the signatures which the applicants call mergeability, characterizing what may be informally referred to as merge-friendly signatures. As described herein, a signature scheme is mergeable if two message/signature pairs can be merged to obtain a new message/signature pair, such operation being invertible and also a public operation, so it does not require knowledge of the secret key.

Embodiments and implementations described herein involve methodologies and technologies facilitating a digital signature scheme that allows a device, e.g., IoT devices and/or other resource-constrained devices, to precompute and store certain data prior to communication which in turn allows the device to produce and communicate authenticated messages in a faster and energy-saving manner.

Embodiments and implementations described herein involve time-based one time password (TOTP) systems configured/programmed in consideration of the limited computational power and energy of device(s), e.g., IoT or other resource-constrained devices, and to provide capability to perform two factor authentication. Such TOTP authentication systems can be based on cryptographic primitives.

DETAILED DESCRIPTION

Figure 1A:
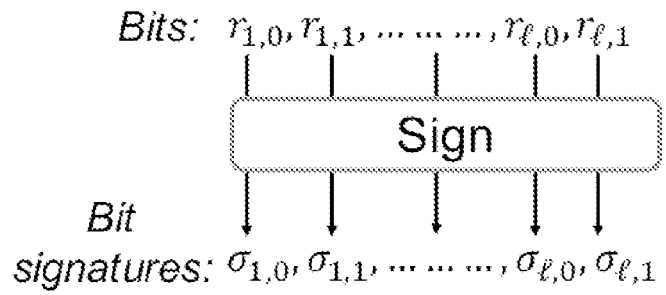
FIG. 1A depicts MSS overview_Setup: user signs $\ell$ pairs of random strings (i.e., signs $2\ell$ random strings) where each pair is mapped to a bit location and each pair string is a random value representing either 0 or 1.

For the purpose of illustrating the invention, there is shown in the accompanying drawings several embodiments of the invention. However, it should be understood by those of ordinary skill in the art that the invention is not limited to the precise arrangements and instrumentalities shown therein and described below.

I. Overview

The signature scheme, Mergeable Stateful Signatures (MSS), is described herein, which yields an authentication protocol with low overhead. As previously noted, MSS operates in a model where the verifier is assumed to always be the same party (e.g., an MQTT broker). This allows state to be maintained across multiple signatures, which in turn allows for efficiency improvements over standard signatures. The system analyzes the security of MSS in the offline/online model of Even, Goldreich and Micali, where the signing algorithm is split into two parts. The first part is costlier and can be performed offline, but importantly, before the message to sign is known. The second part is online, and can make use of the result of the offline computation to provide low cost signature. The efficiency of the online phase is tied to the length of the message being signed. The system is most efficient for short messages, and efficiency degrades as the message length grows. For messages which are 256 bits or longer (in which case, the system would sign a 256-bit hash of the message), the online phase is no faster than a standard public-key signature. Thus, in one embodiment, the IoT device may frequently send small amounts of data to a single server. It is likely that this pattern will be pervasive in IoT and other cyberphysical systems; for example, Table II (see below) shows some recent applications that have an IoT client or a sensor communicating with a single server, and the efficiency improvements introduced by MSS. Furthermore, MSS can also be utilized to reduce the signature verification cost when the client-server roles are switched and the IoT device becomes the server/verifier, which makes the system versatile and useful in other applications (e.g., last two applications in Table II).

TABLE II

| | | | | | | |
|---|---|---|---|---|---|---|
| Example IoT applications for MSS and efficiency gains. | | | | | | |
| | Number of | Message | MSS-RSA vs. base RSA | | MSS-ECEL Gamal vs. base ECELGamal | |
| Application | Messages (per Day) | Size (bits) | Speedup | Extra Battery Lifetime | Speedup | Extra Battery Lifetime |
| Heart rate monitor | 144-1,440 | 8 | 32× | 2× | — | — |
| Continous glucose monitor | 288 | 9 | 28× | 2× | — | — |
| Temperature sensor | 1,440 | 12 | 21× | 2× | — | — |

TABLE II-continued

Example IoT applications for MSS and efficiency gains.

| Application | Number of Messages (per Day) | Message Size (bits) | MSS-RSA vs. base RSA | | MSS-ECElGamal vs. base ECElGamal | |
|---|---|---|---|---|---|---|
| | | | Speedup | Extra Battery Lifetime | Speedup | Extra Battery Lifetime |
| Soil moisture sensor | 1,234 | 14 | 18× | 2× | — | — |
| Vehicle tracker | 2,880 | 57 | 4× | 1.8× | — | — |
| Humidity sensor | 1,440 | 14 | 18× | 2× | — | — |
| Smart electricity meter | 24-1,440 | 40 | 6× | 1.8× | — | — |
| People counting sensor | 96 | 17 | 15× | 1.9× | — | — |
| Water level sensor | 96 | 7 | 36× | 2× | — | — |
| Smart lock | 368 | 21 | — | — | 2× | 1.54× |
| Drone command and control (1 hr. use) | 36,000 | 4 | — | — | 2.1× | 1.56× |

MSS is described in Section II and implement it twice, within two digital signature standards: RSA signatures and elliptic curve ElGamal signatures. In Section III, demonstrated is a concrete application; specifically, described is use MSS to implement a time-based one-time password (TOTP) authentication protocol. TOTP systems allow a user to authenticate herself to a server using a "one-time" password that is valid for a short, fixed time. After the time expires, the user will have to authenticate herself again using another password.

The experiments (implemented on Raspberry Pis) show that the new MSS-based TOTP systems provide appealing efficiency gains (in Section IV). The RSA-based system cuts down authentication latency and energy consumption by 12 and 20 times, respectively, compared to a traditional RSA-based system. Additionally, the elliptic curve ElGamal (ECElGamal) based system reduces authentication latency and energy consumption by 2 and 3 times, respectively, compared to traditional ECElGamal/ECDSA/EC-Schnorr-based system. The ECElGamal-based system also reduces authentication latency and energy consumption by ~82 and 792 times, respectively, compared to a recent TOTP system based on hash chains (with client storage of first hash of each week) but requires double the password size.

Also presented is an asymptotic analysis of MSS's efficiency in Section V. MSS can be used in place of hash chains and reduces their online time×space complexity from O (N) to O (polylog(N)) where N is the number of signatures. Further shown is that the ECElGamal implementation allows us to reduce the offline time to O (polylog(N)) using specifics of the ECElGamal signature scheme. Section VI presents a formal proof of the security of MSS, by defining an incremental forgery game and showing that the attacker cannot win the game (break the system) provided the underlying scheme (RSA or Elliptic Curve) is secure. Section VII presents some concluding remarks.

II. MSS Via Mergeable Signatures

In this section, described is a new signature scheme, MSS (Mergeable Stateful Signatures). MSS allows a client to authenticate herself to a single server efficiently multiple times typically spread over different transactions/times. As mentioned above, the assumption that the receiver is always the same party allows maintaining state across multiple signatures which allows improving efficiency.

A. Signature Preliminaries

Digital signatures are fundamental objects from cryptography. Formally, a signature scheme consists of three algorithms (KeyGen, Sign, Verify) satisfying the syntax:

KeyGen takes a security parameter as a unitary input and generates a key pair (vk, sk);
Sign takes sk and a message as input and outputs a signature σ;
Verify takes a message/signature pair and vk as input and outputs a bit indicating whether the signature is valid.

Additionally, the two properties correctness and security must hold. Correctness says that for all messages msg, if (vk, sk)←KeyGen(1") and σ←Sign(msg, sk), then Verify(vk, msg, σ)=1. Intuitively, security demands that without possession of the secret key, nobody can produce a valid signature for a new message. Formally proved is the security of MSS in Section VI.

In the main construction, MSS, builds on top of signature schemes which support a special malleability property which is called mergeability. MSS has mergeable signatures for modularity. By abstracting (e.g., defining or characterizing) the main part of the construction so it builds on top of a general intermediate primitive, by which the system is able to concretize MSS based on several different cryptographic assumptions (e.g., RSA, BLS, or even Lattice assumptions). This property mergeability is the same as that of homomorphism. Roughly speaking, a signature scheme is mergeable if two message/signature pairs $(msg_1, \sigma_1)$ and $(msg_2, \sigma_2)$ can be merged to obtain a new message/signature pair $(msg^*, \sigma^*)$. This operation must also be invertible in the sense that given $(msg^*, \sigma^*)$ and $(msg_1, \sigma_1)$ one can recover $(msg_2, \sigma_2)$. In example embodiments, it is important that this must be a public operation, so it does not require knowledge of the secret key. Security demands that without the secret key, nobody can produce a valid signature on a new message even one that can be created by merging together two (or more) message/signature pairs which they have already seen signed.

Formally, a signature scheme (KeyGen, Sign, Verify) is mergeable if there exist two additional algorithms Merge and Reconstruct (Merge, Rec) which both take two message/signature pairs $(msg_1, \sigma_1)$, $(msg_2, \sigma_2)$ as input and output a message/signature pair $(msg^*, \sigma^*)$. Moreover, in example embodiments, two additional properties may hold: 1) Merge and Rec are inverses of each other; and 2) if the input signatures are valid then so is the merged signature. Formally, (1) requires that $(msg_2, \sigma_2)$ equals $$Rec((msg_1,\sigma_1),Merge((msg_1,\sigma_1),(msg_2,\sigma_2))).$$

Property (2) requires that if Verify(vk, $msg_i$, $\sigma_i$)=1 for i=1, 2, then $$Verify(vk,msg^*,\sigma^*)=1 \text{ where } (msg^*,\sigma^*) \text{ is one of } \{Merge,Rec\}((msg_1,\sigma_1),(msg_2,\sigma_2)).$$

The reader may wish to keep in mind the example $$\text{Merge}((msg_1, \sigma_1), (msg_2, \sigma_2)) = (msg_1 \cdot msg_2, \sigma_1 \cdot \sigma_2).$$

This will essentially be the case in both of the constructions (MSS on RSA and on elliptic curve Bonch-Lynn-Shacham, BLS) with the precise meaning of multiplication (·) customized for each cryptographic assumption.

B. MSS Overview

Figure 1B:
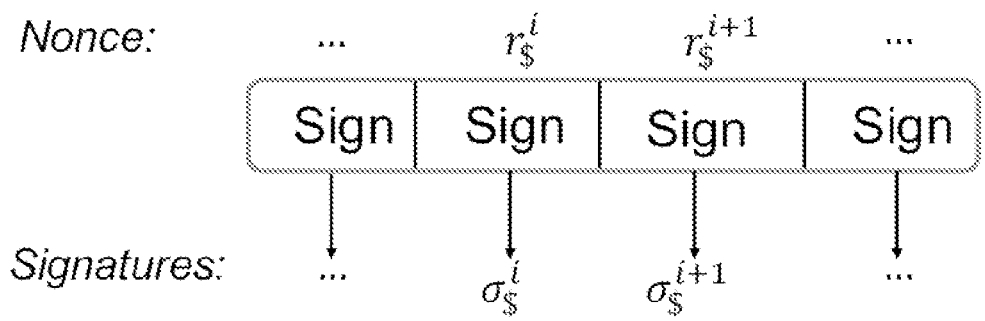
FIG. 1B depicts MSS overview_Offline signing: user apriori signs a fresh nonce and keeps it in storage, which will exclusively be used for next message.
Figure 1C:
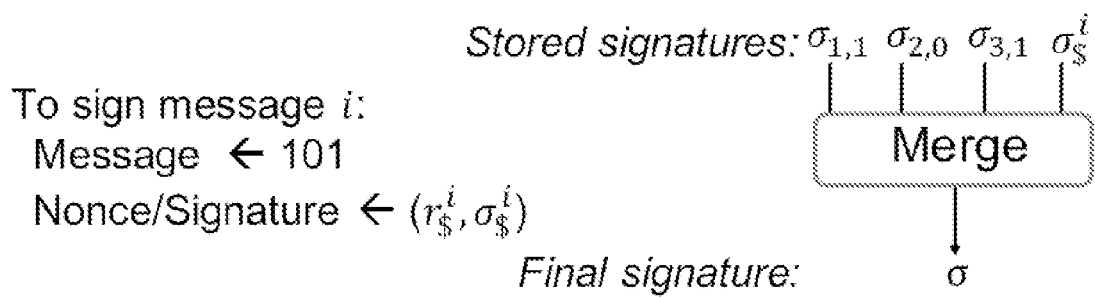
FIG. 1C depicts MSS overview_Online signing: user signs a message by merging/multiplying already stored signatures (in setup and offline signing) corresponding to the message bits and nonce.

FIGS. 1A-1C provided an overview of how MSS operates. Instead of signing a message string all at once, the MSS scheme/protocol uses pre-computed signatures of "representative random strings" for each bit of (a hash of) the message. So as a starting (flawed) example, suppose the message hash h is $\ell$-bits long, and the scheme had chosen $\ell$ pairs of random strings, $\{r_{i,0}, r_{i,1}\}_{i=1,\ldots,\ell}$, (which are made public) and individually signed each string obtaining signatures $\{\sigma_{i,0}, \sigma_{i,1}\}_{i=1,\ldots,\ell}$ (which are kept private). Now each pair of signatures is mapped to a bit location to represent signatures on its bit values (i.e., 0 or 1). Then one could sign a message by sending the signatures which correspond to the bits of h. So, for example, if h=101, the signature would be $(\sigma_{1,1}, \sigma_{2,0}, \sigma_{3,1})$ such that $\sigma_{3,1}$ represents the signature on the value of the third digit in h, which is 1. Note that in this naive implementation, signing a single message requires signing multiple random strings and sending multiple signatures, thus sign time, signature size and verification time are drastically increased. On the other hand, the signer can precompute the $\sigma_{i,b}$'s, $b \in \{0, 1\}$, once during a setup phase and reuse them every time she signs a message, thus obtaining a scheme with very fast online sign-time. The main problem is that this naive scheme will not be secure since if an adversary sees many messages signed, she will eventually learn all of the $\sigma_{i,b}$'s and be able to sign new messages by herself.

To fix this problem with security, mergeable signatures are used rather than sending all of the representative signatures in the clear (which is inefficient and insecure), the system merges them into a single signature. For security reasons, the system also merges in a signature on a fresh random nonce (which can be generated offline). So to summarize, the random representative strings and their signatures (two for each bit) are computed one time during setup, then several nonces and nonce signatures are computed offline and stored. Then once this data is in place, all the client has to do to compute the signature is merge together several of the signatures she has already computed. In the instantiation of mergeable signatures, the merge algorithm is much faster than the signing algorithm. Thus, the online cost of signing a message in MSS is greatly reduced.

MSS makes online time/offline time/space tradeoffs available to the signer; while the signer needs to have one nonce signature ahead of time to achieve fast online signing for the next message, she typically would store a number of nonce signatures at a time (e.g., computed when idle/charging, or replenished periodically from a trusted proxy that is assigned the offline computation) as shown in FIGS. 1A-1C.

C. MSS Via Mergeable Signatures—the Main Contribution

In this section, the main contribution "MSS" is built assuming a general mergeable signature scheme. In order to make authentication efficient for devices with small computational power as previously mentioned, analyzed is MSS in the online/offline model of Even, Goldreich and Micali. In this model, the Sign algorithm is split into two algorithms (Sign$_{off}$, Sign$_{on}$) representing the offline and online procedures. The syntax is that Sign$_{off}$ takes sk (but not the message to sign) as input and produces output $\tau$; Sign$_{on}$ takes (sk, msg, $\tau$) and outputs the signature $\sigma$. Ideally, Sign$_{on}$ should be significantly more efficient than Sign$_{off}$. The intended use case is that Sign$_{off}$ is run offline before the message to sign is known to allow considerable speed and energy advantages for the online signing procedure.

Assume (KeyGen, Sign, Verify, Merge, Rec) to be a mergeable signature scheme, let H be a hash function modeled as a random oracle and let $\ell \in \mathbb{N}$ be a length parameter. In example embodiments, MSS consists of, or includes, four algorithms (KeyGen', Sign'$_{off}$, Sign'$_{on}$, Verify') and supports signatures on $\ell$-bit messages. In the following, it is assumed that verification keys are included as part of the signing keys (this saves some syntax since it prevents us from having to explicitly pass the verification keys to the signing algorithms). Allowed is Merge and Rec to take many inputs rather than just two, without loss of generality: it can repeatedly apply the two-input version.

---

Algorithm 1: KeyGen'($1^n$)

1: (vk; sk) ← KeyGen($1^n$);
2: Initialize two 2 × $\ell$ arrays B, initialized with random strings, and Σ, empty; also initialize U = [ ] an empty list;
3: Set Σ = B.map (r → Sign(sk; r));
4: Output (vk'; sk' = (vk; B; U); (sk; Σ));

---

Algorithm 2: Sign'$_{off}$(sk')

1: Choose a random nonce $r_\$$ and set $\sigma_\$$ ← Sign(sk, $r_\$$);  ▷ where vk, sk are part of sk'
2: Output $\tau' = (r_\$, \sigma_\$)$;

---

Algorithm 3: Sign'$_{on}$(sk', msg, $\tau'$)

1: Parse msg = $b_1 \ldots b_\ell$ as bits, and parse $\tau' = (r_\$, \sigma_\$)$;
2: Set $(r, \sigma) = \text{Merge}(\{(r_{j,b_j}, \sigma_{j,b_j})\}_j, (r_\$, \sigma_\$))$;  ▷ $r_{j,b_j} \in B$ and $\sigma_{j,b_j} \in \Sigma$
3: Output $\sigma' = (r, \sigma)$;

---

Algorithm 4: Verify' (vk', msg, $\sigma'$)

1: Parse msg = $b_1 \ldots b_\ell$ and $\sigma' = (r, \sigma)$;
2: Compute $(r_\$, \sigma_\$) = \text{Rec} (\{(r_{j,b_j}, \sigma_{j,b_j})\}_j, (r, \sigma))$; if $r_\$ \in U$ ,reject and exit;  ▷ This means the nonce $r_\$$ was used previously
3: U.push($r_\$$)
4: Output Verify(vk, r, $\sigma$) = 1

---

Some remarks on Algorithm 1-4 are as follows:
1. Notice that the offline signing algorithm, Sign'$_{off}$, signs a random string, while the online algorithm, Sign'$_{on}$, calls Merge. For all of the mergeable schemes, built in are subsequent sections, Merge will be significantly more efficient than Sign.
2. The list U represents some persistent state maintained by the verifier over time. The purpose is to keep track of all nonces (the $r_\$$ values) used so far to force the signing algorithm to choose a fresh nonce for each new signature. This is important for security.
3. Note that the runtime of Sign$_{on}$ grows with $\ell$ since it requires merging $\ell + 1$ signatures together. Thus the system is most efficient when $\ell$ is small.

Mergeable signatures are, in fact, not hard to find. Two very common signature schemes can be used, RSA signatures and BLS (or, a discrete log/elliptic curve based scheme with a formal security proof) signatures, and both support Merge and Rec operations (see sections below). The security of the construction is analyzed in Section VI.

Mergeable Signatures via RSA

The arithmetic for the RSA signature scheme takes place modulo a composite integer N=pq which is the product of two primes. The scheme works as follows.

KeyGen($1^n$): draws N=pq and e according to the RSA distribution, computes $d=e^{-1}$ (mod $\varphi(N)$) (using its knowledge of p and q, and here $\varphi(N)$ is Euler's totient function: $\Phi(N)=(p-1)(q-1)$) and outputs (vk, sk) where vk=(N, e) and sk=(N, e, d);

Sign msg, (N, e, d): let r=msg (mod N) and output $\sigma=r^d$(mod N);

Verify (N, e), msg, $\sigma$: computer r=msg (mod N), if $\sigma^e=r$ (mod N) output 1, otherwise output 0.

The Merge and Rec algorithms for RSA are modular multiplication as follows:

$$\text{Merge}((r_1,\sigma_1),(r_2,\sigma_2))=(r_1 r_2, \sigma_1 \sigma_2)$$

$$\text{Rec}((r_1,\sigma_1),(r_2,\sigma_2))=(r_1 r_2^{-1}, \sigma_1 \sigma_2^{-1})$$

Note that if vk=(N, e) and ($\sigma_1$, $\sigma_2$) are valid signatures on messages ($r_1$, $r_2$), then $\sigma_i^e = r_i$ (mod N) holds for i=1, 2. Therefore, if $$(r,\sigma)=\text{Merge}((r_1,\sigma_1),(r_2,\sigma_2))=(r_1 \cdot r_2, \sigma_1 \cdot \sigma_2)$$

Then $$\sigma^e=(\sigma_1 \cdot \sigma_2)^e=\sigma_1^e \sigma_2^e=(r_1 \cdot r_2)=r$$

and so $\sigma$ is a valid signature of r.

Mergeable Signatures Via BLS

The arithmetic in BLS scheme takes place in a cyclic group G with generator g that is equipped with a pairing map e: $G \times G \rightarrow G_T$ for another group $G_T$ (called the target group) such that $e(g, g) \neq 1$ and $e(g^a, g^b)=e(g,g)^{ab}$ for all integer exponents a, b. The syntax of the scheme is as follows:

KeyGen($1^n$): draws G and g, and draws a random exponent x, and outputs (vk, sk) where vk=(G, g, $g^x$) and sk=(G, g, x);

Sign msg, (G, g, x): put r=msg and output (r, r);

Verify (G, g, $g^x$), msg, $\sigma$: parse $\sigma=(r, r')$; check that (g, $g^x$, r, r') is a DDH tuple, if so output 1, otherwise output 0.

The Merge and Rec operations here are also based on multiplication:

$$\text{Merge}((r_1,\sigma_1),(r_2,\sigma_2))=(r_1 r_2, \sigma_1 \sigma_2).$$

$$\text{Rec}((r_1,\sigma_1),(r_2,\sigma_2))=(r_1 r_2^{-1}, \sigma_1 \sigma_2^{-1})$$

Similar to RSA, the mergeability can be verified as follows. If vk=(G, g, gr) and ($\sigma$, $\sigma$) are valid signatures on messages then $\sigma_i=(r_i, r_i^x)$ holds for i=1, 2. Therefore, if $$(r,\sigma)=\text{Merge}(r_1,\sigma_1),(r_2,\sigma_2)=(r_1 \cdot r_2, \sigma_1 \cdot \sigma_2)$$

Then $$\sigma=\sigma_1 \cdot \sigma_2=(r_1 \cdot r_2, r_1^x \cdot r_2^x)=(r_1 \cdot r_2),(r_1 \cdot r_2)^x)$$

therefore, when the verification algorithm parses $\sigma$ as (r, r') and checks whether $e(g^x, r)=e(g, r')$, it passes. This is because, $e(g^x, r)=e(g^x, r_1 \cdot r_2)=e(g,(r_1 \cdot r_2)^x)$.

III. MSS Application: Time Based One Time Password (TOTP) Systems

Two factor authentication and similar techniques have been introduced to combat user password weaknesses. Several hardware tokens (e.g., YubiKey) are used today as second factor authenticators, which rely on standard bidirectional communication based challenge-response authentication. As it is becoming more popular to use devices such as IoT devices as second factor authenticators, it might be the case that such devices are offline or have only one-way communication (e.g., from second factor device to authenticating device); in such case, systems such as Duo fall back to one-time password implementations (e.g., D. M'Raihi et al. *Hotp: An hmac-based one-time password algorithm.* Tech. rep. 2005, which is hereby incorporated by reference). In these implementations, however, the next password stays valid until the next authentication (which could be a long time); this makes it subject to various attacks such as phishing. Time-based OTP (TOTP) systems mitigate this issue by assigning each authentication time period tp a different password, and thus limiting the password window-of-use and protecting users from such attacks.

Hash chains have been proposed to implement TOTP systems that do not share secrets with the server while providing time/space tradeoffs for user efficiency (refer to Section V for hash chain authentication). Assuming N represents the hash chain-TOTP system lifespan, a standard choice of parameters indicates $N \approx 2^{21}$ (lifespan of roughly 2 years), with each hash in the chain representing half a minute; nonetheless, their time×space complexity is O(N), which is expensive for constrained users and servers. MSS can provide attractive properties (in terms of time and space) compared to hash chains (see Section V for details).

Figure 2:
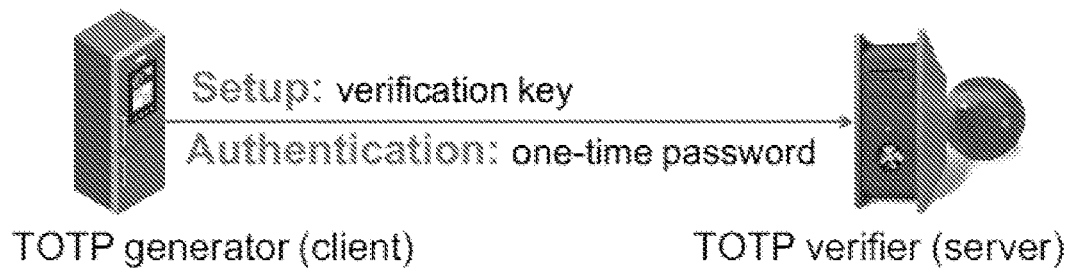
FIG. 2 depicts a TOTP system overview.

In this section, implemented is a MSS based TOTP protocol, which goes through setup and authentication phases (FIG. 2). It allows the device's online authentication algorithm to rely on only lightweight (i.e., non-cryptographic) operations in order to produce/verify a TOTP for a tp. The RSA-based implementation of the protocol significantly speeds up signing at the online time, compared with traditional RSA while the ElGamal-based implementation improves the efficiency of verification by taking advantage of the merging construction for BLS. Optimizing verification is important for situations where the constrained devices are verifiers (e.g., smart locks). Although ElGamal-based signatures are similar to BLS-based ones in that they are both implemented in discrete-log groups, they lack security proof. Nearly all of the arithmetic used in BLS carries over to the ElGamal setting, so the implementation here is thought of as morally as an implementation of the scheme MSS. The discrepancy here is in some sense unavoidable: had the applicants worked with ElGamal signatures in Section II and VI, the applicants may not have been able to prove rigorous security since even the basic ElGamal scheme has no security proof. Likewise, to implement the exact BLS-based protocol may cause the results have given an unfair advantage because base BLS signatures are so much slower than base ElGamal.

A. RSA-based TOTP System a) Setup: Whenever a client wishes to use a TOTP system as a means for authentication, it has to first go through a one-time setup so that both nodes are configured with proper keys using the steps of KeyGen' described in Algorithm 1. The client defines B: =$\{r_{i,b} \in Z'_N | i \in [1, d], b \in \{0, 1\}\}$ that represents all the bit values, where every rib is randomly chosen. The client computes the set of bit signatures $\Sigma$, which contains Sign(sk, r) for each r∈B, where Sign works as Sign described below. Next, it shares the tuple (B, vk, st) with the server, where 'st' denotes the initial time to use the system.

b) Authentication: Whenever the client wants to authenticate itself, it uses st to infer the current authentication time period tp represented in binary (i.e., tp$\in\{0, 1\}^d$ with some pre-agreed on encoding of the time). The authentication procedure is described in Algorithm 5, for which details are as follows:

Defines $\hat{B}=\{r_{i,b}\in B\in[1,d], b\in\{tp_i\}\}$ and $\sigma^*=\{\sigma_{i,b}\in\Sigma | i\in[1,d], b\in\{tp_i\}\}$;

Draws a nonce $r_\$$ and computes $H(vk, r_\$)$, $GCD(H(vk, r_\$), r)=1$ for all $r\in\hat{B}$ to avoid signature overlap;

Computes nonce signatures as $\sigma_\$\leftarrow Sign_{\mathit{off}}(sk, r_\$)=H(vk, r_\$)^{sk,d}$ mod N and sets $\sigma':=\sigma'\cup\{\sigma_\$\}$ Runs $\hat{\sigma}\leftarrow Sign_{on}(sk, tp, \sigma_\$, r_\$)=\Pi_{\sigma_i^*\in\sigma^*}\sigma_i^*$ mod N It then sends the TOTP tuple $(r_\$, \hat{\sigma})$ to authenticate itself.

---

Algorithm 5: Authentication

1: $\sigma \leftarrow Sign_{\mathit{off}}(arg_1, arg_2)$;
2: $\hat{\sigma} \leftarrow Sign_{on}(sk, tp, \sigma_\$, arg_3)$;   ▷ Server runs Verify( )
3: if Verify(vk, tp, $\hat{\sigma}$, $arg_3$) = 1 then
4:    ACCEPT;
5: else
6:    REJECT;
7: end if

---

Upon receipt of the TOTP, the server infers the same tp from its own clock and the shared st to avoid accepting void TOTPs that might have been stolen/replayed. In order to verify whether the received TOTP is legitimate, it does the following:

Creates a verification subset $\hat{V}:=\hat{B}\cup\{H(vk, r_\$)\}$;

Runs Verify(vk, tp, $\hat{\sigma}$, $r_\$$), which checks if the following equation holds $\Pi_{v\in\hat{V}}(v)=^?\hat{\sigma}^{vk\cdot e}$ mod N;

If successful, the client is authenticated.

c) Efficiency and Overhead: In order to avoid communicating nonces $r_\$$ during authentication, both nodes can be configured to derive unique and coprime nonces using a pseudorandom function (e.g., $r_\$^i$=H (counter)). Since, in TOTP systems, tp increases over time and that the client uses its TOTP generation algorithm only once in each time-interval, tp can be used by both nodes to also derive the nonces $\{r_\$\}_i$ (e.g., $r_\$^i$=H(tp)) without loss of security; this releases the server from keeping state in memory as well as allows both nodes to avoid communicating such nonces over the network during authentication. The enhancement in Jurjen N. Bos and David Chaum. "Provably Unforgeable Signatures". In: CRYPTO. Springer, 1992, which is hereby incorporated by reference, can also be used in the present case to reduce the size of signature set $\Sigma$ and bit value set B to half—particularly important for edge devices with limited storage; instead of explicitly dealing with values representing 0 for each different digit, assumed is the presence of 1 implies absence of 0 and vice versa. This allows clients to store signatures corresponding to values representing 1 for all digits only, namely $\Sigma'=\{\sigma_{i,1}\in\Sigma\}_{i\in[1,d]}$. Similarly, the server only keeps values representing 1 for all digits, namely $B'=\{r_{i,1}\in Z\}_{i\in[1,d]}$. It can also use one set of coprime values representing different bits (i.e., the set B') for all clients in the system. Clients can also store only one key of the key pair, preferably vk since the recommended size of the public verification exponent $vk\cdot e\in\{0, 1\}^{\geq 17}$ is smaller than the private signing exponent $sk\cdot d\in\{0, 1\}^{\geq 0.292\cdot|N|}$, and derive one key from the other as needed.

B. ECElGamal-Based TOTP System

In several DDH-based signatures (e.g., ECDSA), the most expensive part of the signing operation can by design be done offline; however, signature verification still has to incur at least 2 exponentiations in the critical online time, which can be expensive for a limited-resource verifier (e.g., a smart lock). The MSS-based ECElGamal construction allows us to replace one of the exponentiations with only a few multiplications (e.g., 21 multiplications for a 2-year TOTP system), thus reducing online verification time significantly.

a) Setup: When the instantiation of Algorithm 1 is done using ECElGamal signatures, the output key pair is (sk=(G, g, x), vk=(G, g, xg)); where g is the public base point for the elliptic curve, $sk\cdot x\in[2, N-1]$ is a secret random scalar and $vk\cdot xg$ is a point on the elliptic curve G. In the second step, B is chosen in such a way which guarantees that the overlap amongst signatures of different authentication times is avoided. Hence, the following constraint: $\Sigma_{r^*\in\hat{B}}\cdot(r^*)\neq\Sigma_{r'\in\hat{B}}(r')$, $\forall B\cdot\neq B'\subset B$ must be satisfied. Therefore, selected is $B=\{r_{i,b}=\ell^e \mod N | i\in I=[1, d], b\in J=\{0, 1\}, \ell\in Z_N, e\in[1, |I|\cdot|J|]\}$, where N is a large prime determining the order of an elliptic curve group. KeyGen' in this case is the same as the one in Algorithm 1 except that the client sends (B, vk, st) to the server and the server computes the last step of KeyGen' as $\Sigma=B\cdot map\ (r\rightarrow g\times r)$.

b) Authentication: This procedure follows the same protocol described in Algorithm 5 and the three procedures ($Sign_{\mathit{off}}$, $Sign_{on}$ and Verify) are computed as follows. The signature of tp (current time to authenticate) consists of the tuple $(\sigma_\$, \hat{\sigma})$. Similar to normal ECElGamal signatures, $\sigma_\$=(x_1, y_1)$ is a point on the curve calculated by $\sigma_\$=Sign_{\mathit{off}}(r_\$, g)=r_\$\times g$, where $r_\$\in[2, N-1]$ is an integer nonce that is coprime with the modulus N (i.e., $GCD(r_\$, N)=1$) so that it has a multiplicative inverse $r_\$^{-1}$ that will be needed to calculate the second part of the signature; $r_\$$ must be unique and random for each signature to prevent A from recovering sk. In order to compute any $\sigma_\$$, only needed is the set $P=\{a\times g: a\in\{2^0, \ldots, 2^{\log(N)-1}\}\}$ pre-computed and stored in memory.

In order to calculate $\hat{\sigma}$, the client creates the subset $\hat{B}=\{r_{i,b}\in B\}_{i\in[1,d]\cdot be\{tpi\}}$ that contains the digit values corresponding to its current authentication time period tp. It then runs $\hat{\sigma}\leftarrow Sign_{on}(sk, tp, \sigma_\$, r_\$)$ which outputs the second part of the signature, $\hat{\sigma}=r_\$^{-1}(\Sigma_{r\in\hat{B}}(r)-sk\cdot x\cdot\sigma_\$\cdot x_1)$ mod N. It communicates the TOTP tuple $(\sigma_\$, \hat{\sigma})$ to authenticate itself. The server now creates a signature verification subset $\hat{\Sigma}=\hat{B}\cdot map\ (r\rightarrow g\times r)\subset\Sigma$, which contains already computed values (at setup) corresponding to tp; it then runs the procedure Verify(vk, tp, $\sigma_\$$, $\hat{\sigma}$) to check the validity of $\sigma_\$\cdot x_1\times vk\cdot xg+\hat{\sigma}\times\sigma_\$=?\Sigma_{v\in\hat{\Sigma}}v$.

c) Efficiency and Overhead: The technique mentioned earlier that suggests keeping values corresponding to 1 only for all digits is also applicable here (i.e., $\Sigma'$ and B'). Since $\sigma_\$$ is independent of tp, it can be calculated and sent ahead of time, allowing the server to calculate part of the left side of the verification equation apriori, namely $\sigma_\$\cdot x_1\times vk\cdot xg$; thus, the only expensive operation left for signature verification becomes $\hat{\sigma}\times\sigma_\$$. This approach enables the TOTP system to be faster in the online authentication time. It also allows clients to send only half the signature at the critical time of authentication, namely $\hat{\sigma}\in\{0, 1\}^{|N|}$. NIST suggests that elliptic curves with $|N|=256$ can provide 128-bit security; if this recommendation is followed, the system can have clients send only 256-bit TOTP tokens at the online authentication time. The server can also use one set of values representing the different digits (i.e., $\Sigma'$) for all clients to avoid per user storage.

Figure 3:
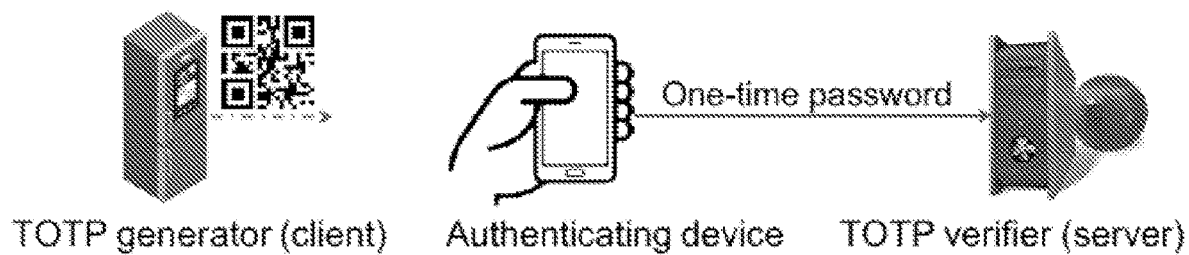
FIG. 3 depicts offline second factor authentication.

C. Other Considerations
  a) Offline Second Factor Authentication: The systems require one-way communication, which makes them a good fit for offline second factor authenticators. Mechanisms facilitating communication of TOTPs generated by offline devices (e.g., a refrigerator with a screen) can be used in the systems (e.g., QR encoding). FIG. 3 illustrates an example system model for edge devices using the new TOTP systems for offline second factor authentication.
  b) Clock Synchronization: Similar to standard TOTP systems, the systems require synchronized clocks at the client and server. Natural delay between the time of generating a TOTP at the client and the TOTP verification at the server can cause authentication failure. The server can allow a small window of time skew (e.g., 30 seconds before the current time) and thus can verify the received TOTP accordingly, as used in standard TOTP systems.

IV. Implementation and Evaluation

Implemented was a prototype of the RSA and ECElGamal-based TOTP systems. For comparisons with counterparts, implemented are TOTP systems that rely on SHA-256-based 1-dimensional hash chains (referred to as 1D/1DHC), RSA-based multi-dimensional hash chain (MDHC), traditional ECElGamal, ECDSA, EC-Schnorr and traditional RSA with full domain hash (RSA-FDH). RSA is used with 3072-bit modulus, and all elliptic curve cryptography (ECC)-based signatures use the NIST P-256 curve.

A. Experimental Setups

The experiments were taken for TOTP systems that had a lifespan of ~2 years (i.e., $2^{21}$ TOTPs). They were done on a constrained Raspberry Pi Zero W (RPi), with a single-core 1.0 GHz CPU and 512 MB RAM, and a laptop, with a dual-core 3.0 GHz CPU and 16 GB RAM. The client and server play the role of the TOTP generator and the TOTP verifier, respectively. The setups include: a laptop and a RPi (e.g., a smart lock scenario); a RPi and a laptop (e.g., a smart watch scenario); and two RPis (e.g., a car gate scenario). Referred to is the first and last hash in a chain as head and tail, respectively. Hash chain based authentication is described in Section V. RSA public exponents (used for verification or hashing) were set to size ≥17 bits. In case of 1DHC, the server constantly replaces its tail with the hash used at last successful authentication. Also considered is a case where the client already has in storage hashes across the chain that correspond to the beginning of each month/week, which helps expedite calculating any target hash in the chain. Also noted is that in this implementation, a simpler SHA hash is also used as in the scheme of D. Kogan, N. Manohar, and D. Bonch. "T/Key: Second-Factor Authentication From Secure Hash Chains". In: CCS. ACM, 2017, which is hereby incorporated by reference. Also proposed and evaluated is a MDHC-TOTP system with 21 dimensions (referred to as 21D), with each dimension being 2 hashes long so as to offer $2^{21}$ possible TOTPs and decrease the chain diameter (i.e., make the number of hashes smaller, although the system may have to use a commutative hash such as RSA). All ECC-based systems calculate the first part of the signature before knowledge of next tp.

B. Performance and Overhead Analysis

Discussed is the performance and overhead of the TOTP systems and the other alternatives, with focus on the online authentication phase. The authentication phase is broken down into two sub-tasks: (1) Generation of a TOTP at the client side, which is generating a target hash in the chain for hash chains, and a signature for the rest of the schemes; and (2) Verify of the TOTP at the server side, which is checking if the received TOTP can hash forward to the tail for hash chain-based schemes, or verifying a signature for the other schemes.

Figure 4:
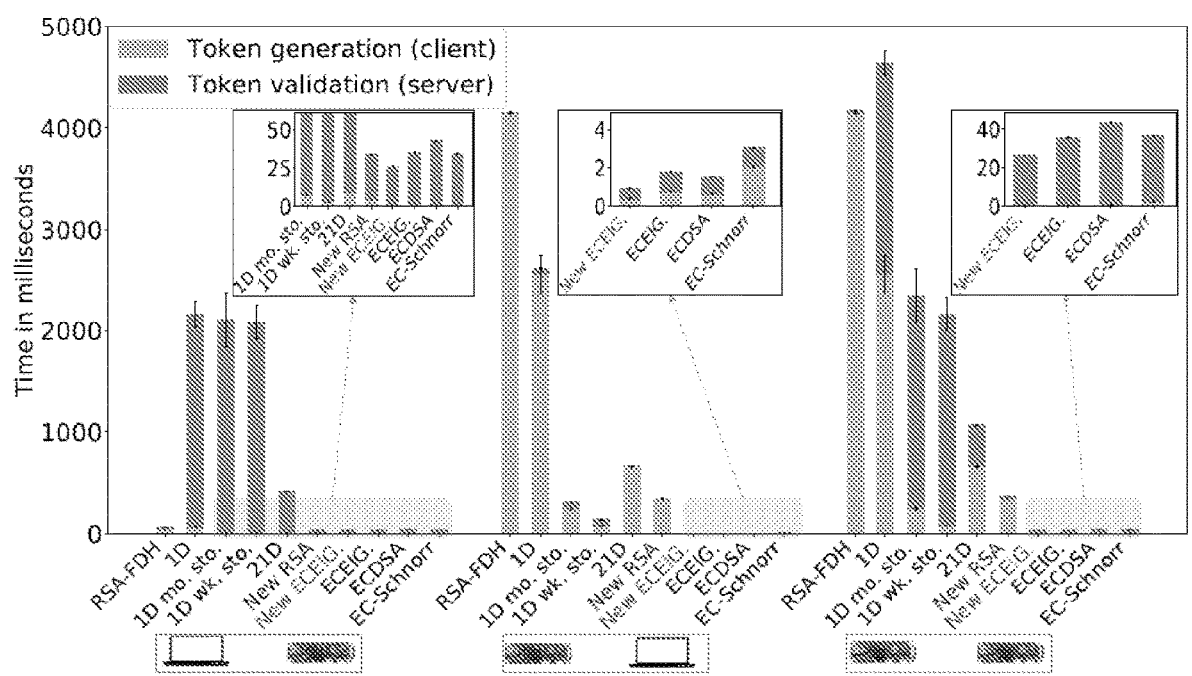
FIG. 4 is a graph showing Authentication latency of TOTP systems.

FIG. 4 demonstrates that the MSS-based ECElGamal-TOTP system reduces latency to complete authentication compared to the following alternatives as follows: RSA-FDH (158× reduction), 1DHC (best case with client storing hashes of every week beginnings, 82×), MDHC (41×) and traditional ECElGamal/ECDSA/EC-Schnorr systems (2×), respectively for the IoT to IoT scenario. The other proposed RSA-TOTP system also cuts down authentication latency by ~12, 6 and 3 times compared to alternatives based on RSA-FDH, 1DHC (with client hash storage as in the previous case), and MDHC, respectively. Even though computations required at the client can be reduced in TOTP systems based on 1DHC by keeping some hashes along the chain as shown in the results, the server cannot use this technique and keep such hashes since this reveals future passwords and makes them susceptible to theft in case of server compromise attacks, necessitating the full chain traversal.

Figure 5:
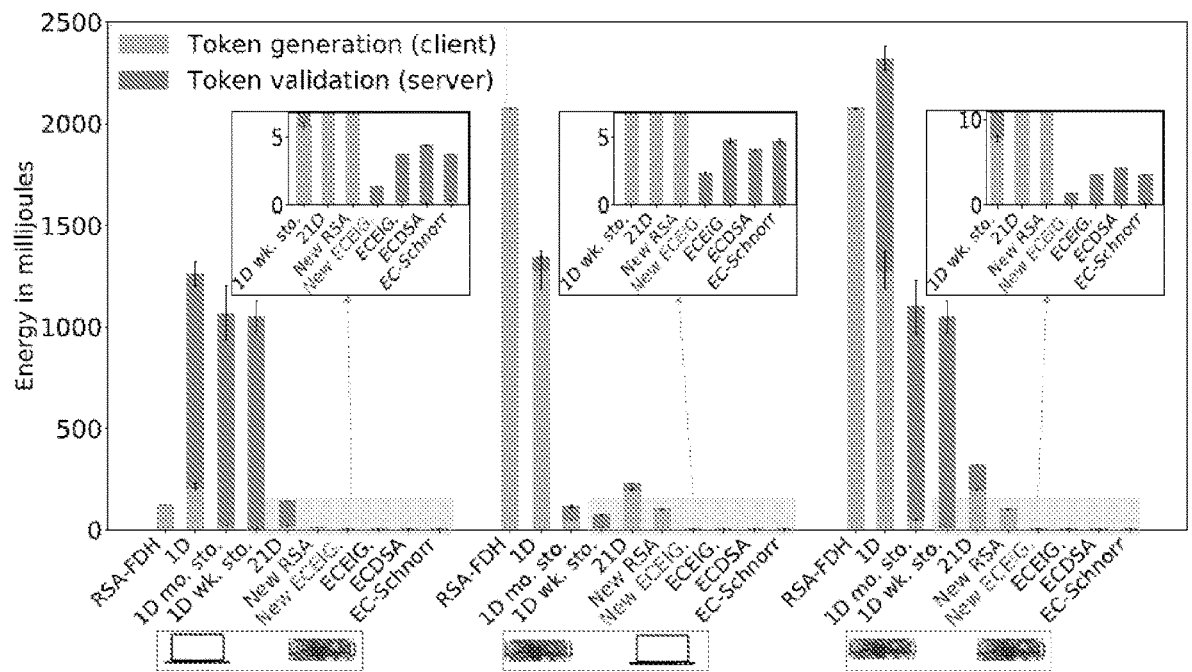
FIG. 5 is a graph showing Authentication energy consumption of TOTP systems.

FIG. 5 shows the energy consumption for each scheme (measured using a power meter). The MSS-based ECElGamal-TOTP system provides energy savings of a factor of 1572, 792, 243 and 3 compared to its alternatives: RSA-FDH, 1DHC (with client hash storage as in the previous case), MDHC and traditional ECElGamal/ECDSA/EC-Schnorr systems, respectively. The MSS-based RSA-TOTP system also reduces energy consumption by 20, 10 and 3 times compared to RSA-FDH, 1DHC (with client hash storage as in the previous case) and MDHC TOTP systems, respectively.

Table III (below) shows the parameters kept at each node and amount of storage needed for them across all systems. Since online-offline signature schemes keep parameters that are pre-processed offline, they require more storage than traditional signature schemes. As an optimization to traditional ECEl-Gamal, ECDSA, EC-Schnorr and the ECElGamal, during setup pre-compute the system may store different bases P that allow such schemes to generate 2 nonce signatures using only O(log N) storage where N is the total number of signatures in the life of system. For all elliptic curve schemes (including the new ECElGamal), the client side requires more storage than other systems based on hash chains and RSA; however, this storage is still less than 16 KBytes which is reasonable for modern IoT devices given the saving in power and computational delay. The server storage requirement is reduced by 4× and 2× compared to MDHC and RSA-FDH, respectively. The ECElGamal outperforms traditional ECElGamal, without requiring extra storage at the server side while requiring only a few extra bytes at the client. The new RSA system improves on traditional RSA, but underperforms the simpler hash and EC based systems. However, since it offers formal security proof (not available in ECDSA, EC-Schnorr or ECElGamal), it may be of interest to high assurance applications.

TABLE III

Storage for TOTP systems.

| TOTP System | Client Size | Client Param. | Server Size | Server Param. |
|---|---|---|---|---|
| RSA-FDH | 391 | st, vk.N, vk.e | 388 | st, vk.N |
| 1D, | 31, | st, salt, | 31 | st, salt, tail |
| 1D mo. sto., | 409, | head, hashes | | |
| 1D wk. sto. | 1705 | | | |
| MDHC (21D) | 817 | st, vk.N, $\{vk.e_i\}_i$, head | 772 | st, vk.N, head |
| New RSA | 8839 | st, vk.N, vk.e $\Sigma'$, $\sigma_\$$ | 388 | st, vk.N, |
| New ECElGamal | 16513 | st, sk.x, $r_\$^{-1}$, $\sigma_\$.x_1$, B, P | 196 | st, vk.xg, vk.xg · $\sigma_\$.x_1$, $\sigma_\$$ |
| ECElGamal | 16484 | st, sk.x, $r_\$^{-1}$, $\sigma_\$.x_1$, P | 196 | st, vk.xg, vk.xg · $\sigma_\$.x_1$, $\sigma_\$$ |
| ECDSA | 16484 | st, sk.x, $r_\$^{-1}$, $\sigma_\$.x_1$, P | 100 | st, vk.xg, $\sigma_\$$ |
| EC-Schnorr | 16516 | st, sk.x, $r_\$$, $\sigma_\$$, P | 68 | si, vk.xg |

V. Asymptotic Efficiency of MSS

In this section, analyzed is MSS's time and space complexity in comparison to hash chains. MSS provides similar functional properties to hash chains and can be used in any context where hash chains are applied. First provided is an analysis of hash chains to be able to provide a baseline. Show is that MSS reduces the time×space complexity from O(N) to O(polylog(N)).

Figure 6:
FIG. 6 depicts a one-dimensional hash chain.
Figure 7:
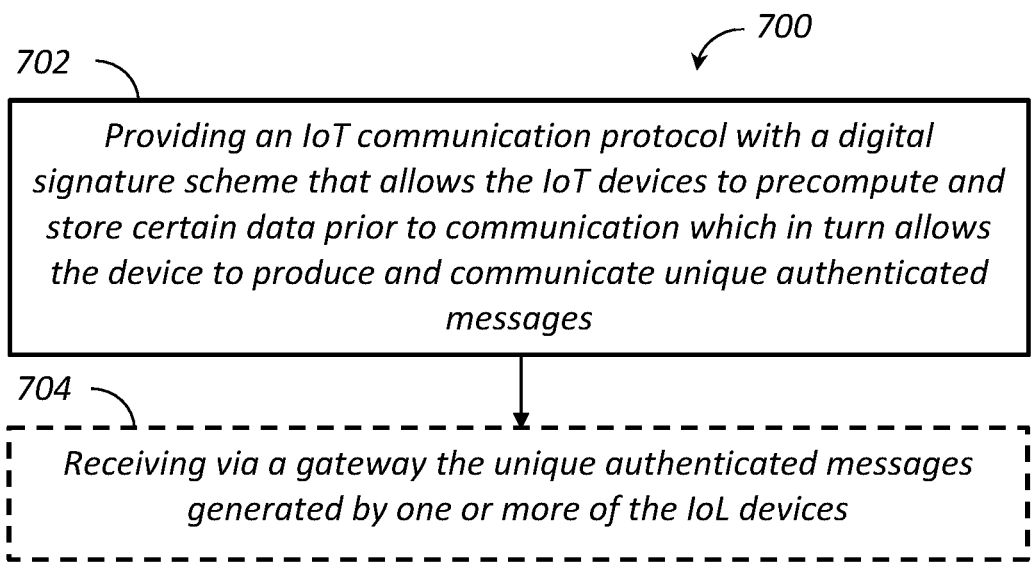
FIG. 7 is a flow chart showing an example TOTP authentication method.

Given a hash function H, a hash chain (FIG. 6) is a list of vertices $\{v_0, \ldots, v_N\}$ where each $v_i$ is obtained by hashing the value before it (i.e., $v_i$ is labeled by a string $x_i$ such that $x_{i+1}=H(x_i)$ holds for all i). The first vertex $v_0$ is called the head of the chain, $v_N$ is the tail. The labels in a hash chain can be computed in the "forwards" direction (i.e., given $x_i$ one can compute $x_{i+1}$

What is claimed is:

1. A system of or operatively interfaced with an IoT environment inclusive of internet of things (IoT) devices, the system comprising:
a hardware-implemented computational platform configured to generate authenticated messages utilizing mergeable stateful signatures to generate authenticated;
wherein two or more message/signature pairs are merged by the computational platform to obtain a new message/signature pair, said system being invertible and also a public operation, so it does not require knowledge of a secret key, which allows a client to authenticate itself to a single server multiple times spread over different transactions and times.

2. The system of claim 1, wherein each of the authenticated messages are unique for a lifespan of the system.

3. The system of claim 1, wherein the authenticated messages are client-initiated.

4. The system of claim 1, wherein the authenticated messages are IoT device-initiated.

5. The system of claim 1, wherein the system is stateful in that state, or verifier identity, is maintained across multiple messages/signatures.

6. The system of claim 1, wherein a construction of the computational platform configured to generate authenticated messages utilizing mergeable stateful signatures is defined or characterized such that it builds upon a general intermediate primitive.

7. The system of claim 1, wherein the IoT devices include one or more of: a smart watch, a smart refrigerator, a thermostat, and a heart rate monitor.

8. The system of claim 1, wherein the IoT devices are configured/controlled to periodically send readings to a gateway.

9. The system of claim 1, wherein the computational platform is part of:
a two-factor authentication system,
a system of a cloud provider for the IoT devices,
a security app, or
an authenticator app.

10. A time-based one-time password(TOTP) system comprising:
a computer hardware-implemented architecture, platform or interface configured/programmed to periodically generate unique time-limited passwords for-two factor authentication that allows an internet of things (IoT) device to authenticate itself to a server;
wherein two or more message/signature pairs are merged by the computer-implemented architecture to obtain a new message/signature pair which is a process that is invertible and also a public, so it does not require knowledge of a secret key, which allows a client to authenticate itself to a single server multiple times spread over different transactions and times.

11. The TOTP system of claim 10, wherein the computer-implemented architecture, platform or interface is configured/programmed to take into consideration the computational power and energy limitations of IoT devices and to provide the IoT devices with the ability to perform two factor authentication.

12. The TOTP system of claim 10, wherein the computer-implemented architecture, platform or interface is configured/programmed to facilitate and/or utilize offline second factor authentication.

13. The TOTP system of claim 10, wherein the computer-implemented architecture, platform or interface is configured/programmed utilizing one or more cryptographic primitives.

14. A method of reducing authentication latency and energy consumption for a time-based one-time password (TOTP) system implementation on IoT devices, the method comprising:
providing an internet of things (IoT) communication protocol with a digital signature step that allows the IoT devices to precompute and store data prior to communication which in turn allows the device to produce and communicate unique authenticated messages;
wherein two or more message/signature pairs are merged by the IoT communication protocol to obtain a new message/signature pair, said digital signature method being invertible and also a public operation, so it does not require knowledge of a secret key, which allows a client to authenticate itself to a single server multiple times spread over different transactions and times.

15. The method of claim 14, further comprising:
receiving via a gateway the unique authenticated messages generated by one or more of the IoT devices.

16. The method of claim 14, wherein the gateway is a local/cloud gateway or smartphone.

17. The method of claim 14, wherein the unique authenticated messages are periodically generated by one or more of the IoT devices.

18. The method of claim 14, wherein the IoT devices include one or more of: a smart watch, a smart refrigerator, a thermostat, and a heart rate monitor.

\* \* \* \* \*